3,100,807
DEHYDROGENATION OF ALKYLATED AROMATIC HYDROCARBONS
Carroll G. Hatfield and Gordon H. Lovett, Texas City, Tex., assignors to Monsanto Chemical Company, St. Louis, Mo., a corporation of Delaware
No Drawing. Filed Feb. 18, 1960, Ser. No. 9,445
5 Claims. (Cl. 260—669)

This invention pertains to an improved method for the dehydrogenation of alkylated aromatic hydrocarbons whereby the conversion of reactant to final product is greatly increased without loss in yield.

The process of manufacturing styrene and related compounds by rapidly passing alkylated aromatic hydrocarbons and steam at high temperatures over a suitable catalyst bed is common knowledge in the trade. For example, in the production of styrene, the usual method is to mix superheated steam and vaporized ethylbenzene in the correct proportions, the resultant temperature being the reaction temperature, and then pass the mixture through a catalytic reactor where dehydrogenation of the ethylbenzene to styrene occurs.

The dehydrogenation of an alkylated aromatic hydrocarbon is a strongly endothermic reaction. Therefore, the amount of the hydrocarbon dehydrogenated is dependent on the amount of heat supplied to the reactor per unit of the alkylated aromatic hydrocarbon. Two types of reactors have been in common use. They are (1) a reactor containing a massive fixed bed of catalyst where the heat of reaction is supplied solely by superheated steam added with the hydrocarbon feed and (2) a shell and tube reactor where heat is supplied through the tube walls from flue gases on the outside to maintain the reaction at a constant temperature. In the massive fixed bed, which is most universally used, the heat input and therefore conversion of the alkylated hydrocarbon can be increased by increasing the amount or temperature of the superheated steam added with the feed to the reactor. However, this has to be balanced against yield or by-product formation and cost of the steam itself and generally speaking, the hotter the mixed stream to the reactor the lower the yield.

Various schemes have been tried to increase dehydrogenation conversions while maintaining yields at optimum levels. Catalysts have been improved by changing constituents and particle size and reactors have been designed in different shapes and sizes. These advances have resulted in attainment of conversions of 38% on a plant scale with a reasonable yield.

It is the object of the present invention to provide a new and novel method of increasing dehydrogenation conversions of alkylated aromatic hydrocarbons to vinyl substituted aromatic hydrocarbons. It is a further object of this invention to provide a new method of increasing the dehydrogenation conversion of ethylbenzene to styrene from approximately 38% to approximately 60% with no significant decrease in yield or to increase yield with no decrease in conversion. These and other objects and advantages of the invention will become apparent from the following description of the invention.

According to this invention the alkylated aromatic hydrocarbon to be dehydrogenated is mixed with steam and fed to a dehydrogenation catalyst bed containing reactor at a temperature which is lower than the usual and ordinary dehydrogenation reaction temperature. The temperature of the mixture in the reactor is continuously raised by means of indirect heat energy as it passes through the catalyst bed so that the temperature of the mixture as it leaves the reactor is higher than it was when it entered the reactor. The vinyl substituted aromatic hydrocarbon is subsequently separated from the reaction mixture by distillation and recovered as substantially pure vinyl substituted aromatic hydrocarbon. Thus, by this invention addition of substantially more heat energy into the reaction without increasing the reaction temperature much above normal dehydrogenation temperatures is accomplished.

The following examples illustrate respectively the invention herein described and the usual adiabatic dehydrogenation reaction. The conditions in these examples are for the dehydrogenation of ethylbenzene to styrene but should not be construed as so limiting the invention.

*Example I*

Vaporized ethylbenzene (0.48 pounds per hour) and steam (1.15 pounds per hour) were mixed in a preheater and the mixture was heated to 580° C. This stream was fed into the reactor and was passed through a catalyst bed of a dehydrogenation catalyst in the form of $\frac{1}{16}$ inch pellets. This catalyst is constituted of a major proportion of ferric oxide, and minor proportions of chromium oxide and potassium oxide. As the ethylbenzene and steam passed through the catalyst bed, heat was continually added by eleven 100-watt electric heaters equally spaced along the entire 30 inch length of the catalyst bed. The heaters were constructed of wound Nichrome ribbon enclosed in a nonconductive sheath and were in the shape of cylinders 1½ inches in diameter and 2 inches long. A quantity of heat in excess of that required to propagate the reaction had been continually supplied so that at the exit of the reactor the temperature of the reactants was 635° C. The composition of the reaction mixture leaving the reactor was 57% styrene, 1.35% benzene, and 3.65% toluene. The yield of styrene from ethylbenzene was subsequently calculated to be 90.6 mol percent.

*Example II*

Vaporized ethylbenzene (1.15 pounds per hour) and steam (0.25 pound per hour) at 540° C. were mixed with 2.00 pounds per hour of superheated steam at 700° C. and the resultant mixture fed immediately into the catalytic dehydrogenation reactor at 620° C. The ethylbenzene was dehydrogenated over a catalyst bed identical to that in the example above and the reaction mixture effluent from the reactor was 550° C. The final product contained 32.8% of the ethylbenzene converted to styrene. The yield of ethylbenzene to styrene was 90.2%. This mixture was cooled and separated and the styrene product was recovered by distillation.

The particular advantage of this invention is the greatly increased conversion of alkylated aromatic hydrocarbons to vinyl substituted aromatic hydrocarbons which was unexpected in view of numerous reaction schemes in the prior art which were not significant enough to justify changes or additions in the usual and normal method, that is, adiabatic reaction, used predominantly in the commercial process of dehydrogenating alkylated aromatic hydrocarbons.

One reason why increases in conversions occur in this invention is because of the high temperatures attained at the exit of the reactor which prohibits the equilibrium point in the reaction from being reached and thus keeps the reaction actively proceeding until the reactants leave the reactor.

Another advantage of this invention is that the steam added with the alkylated aromatic hydrocarbon need not be superheated as much as required in the usual adiabatic or isothermal dehydrogenation reaction. Although heat energy is saved at this point, it is added subsequently in the catalyst bed to raise the temperature of the reaction components there. However, more of the heat energy added to the catalyst bed is converted to the heat of reaction necessary to form the vinyl substituted aromatic hydrocarbon and, therefore, is used much more efficiently.

Another accomplishment of this invention is that less thermal decomposition occurs prior to reaction than occurs in an ordinary adiabatic reaction and thus higher yields are attained. This is true because the inlet temperatures used in this reaction are usually lower than those used in the adiabatic reaction where all the heat must be supplied prior to reaction.

In the practice of this invention no additional steam or hydrocarbon is introduced into the reactor past the reactor inlet. However, it is possible to add steam or hydrocarbon is small quantities, if desired, and still utilize the invention. All heat energy added to the reactants must be added indirectly such that no physical contact between the reaction components and the heating medium is experienced. Such devices as coils in the catalyst bed, through which steam, flue gases, or other heating mediums are passed, can be used. Also applicable would be a tubular type reactor with the catalyst contained in the tubes and a heating fluid passing through the shell area surrounding the tubes. The use of electrical coils surrounding the catalyst bed or perhaps wound inside the catalyst bed is another means which could be used for adding heat to the reactants.

Depth of the catalyst bed can be varied depending on the most economical depth for the alkylated aromatic hydrocarbon feed rate and the amount of heat that must be added in the area and dwell time available. Any depth from about 6 inches up to approximately 50 feet can be used in practicing this invention but for economy of operation the preferred commercial reactor would have a catalyst bed depth of from 2 feet to about 6 feet.

Pressure is not a significant factor in this invention. The reaction operates at atmospheric pressure or in a vacuum in some cases, but several pounds per square inch gage is necessary to overcome the pressure drop in the catalyst bed and in the equipment subsequent to the reactor.

The amount of temperature rise required to practice this invention is dictated by the alkylated aromatic hydrocarbon to be dehydrogenated and the economics of the process. However, generally speaking any noticeable conversion increase can more than offset the cost of additional heat energy to raise the temperature of the reacting hydrocarbon and steam in the reactor. Any temperature rise across the catalyst bed in the range of 10° C. to 100° C. will show the significant conversion increases of alkylated aromatic hydrocarbon to vinyl substituted aromatic hydrocarbon discovered by this invention. However, the temperature rise across the catalyst bed should be preferably in the range of 25° C. to 75° C. to realize the greatest benefits from this new dehydrogenation scheme.

The invention can be practiced with a dehydrogenation reaction temperature in the range of 500 to 700° C. but for economy of operation preferably in the range of 550 to 650° C.

It has been determined that the present method can be operated with as little as a total of 0.8 pound of steam or as high as 20 pounds of steam per pound of alkylated aromatic hydrocarbon. However, for practical reasons, the preferred range is from 1.0 to 2.5 pounds of total steam per pound of alkylated aromatic hydrocarbon.

Reactor size has no bearing on the operation of the invention but it is presumed that the optimum size to give the proper residence time, as is usual in this type of dehydrogenation reaction, will be used.

Reactor configuration is likewise unimportant. This invention can be practiced in a fixed bed reactor, tubular reactor, or fluidized bed reactor with equal success.

Any well known dehydrogenation catalyst such as ferric oxide-potassium oxide, magnesium oxide-ferrous oxide-potassium carbonate, alumina-silica-nickel or others may be used.

By similar procedure, other alkylated aromatic hydrocarbons such as isopropylbenzene, diethylbenzene, ethylnaphthalene, and ethylchlorobenzene may be dehydrogenated to produce a vinyl substituted aromatic hydrocarbon.

What is claimed is:

1. In the dehydrogenation of an alkylated aromatic hydrocarbon wherein the alkylated aromatic hydrocarbon and steam mixture is passed through a dehydrogenation catalyst bed at a temperature in the range of about 500° C. to about 700° C., the improvement comprising addition of heat energy to said mixture by indirect heat transfer means into the said catalyst bed to continuously raise the temperature of the alkylated aromatic hydrocarbon and steam mixture from about 10° C. to about 100° C. throughout the time the mixture passes through said catalyst bed.

2. The process described in claim 1 wherein the dehydrogenation reactor catalyst bed depth is in the range of from 6 inches to about 50 feet.

3. The process described in claim 1 wherein the alkylated aromatic hydrocarbon is ethylbenzene.

4. The process described in claim 2 wherein the alkylated aromatic hydrocarbon is ethylbenzene.

5. The process described in claim 1 wherein the dehydrogenation reaction temperature is in the range of 550° C. to 650° C., the dehydrogenation catalyst bed depth is in the range of from 2 to 6 feet, and the reaction mixture temperature rise is in the range of 25° C. to 75° C.

References Cited in the file of this patent

UNITED STATES PATENTS

| | | |
|---|---|---|
| 2,170,437 | Voorhies | Aug. 22, 1939 |
| 2,198,545 | Levine | Apr. 23, 1940 |
| 2,309,986 | Ruthruff | Feb. 2, 1943 |
| 2,389,215 | Singleton | Nov. 20, 1945 |
| 2,851,502 | Bowman et al. | Sept. 9, 1958 |